United States Patent [19]

Shimp

[11] 4,176,221

[45] Nov. 27, 1979

[54] SOLUBLE RESINOUS PRODUCTS OF POLYEPOXIDE-AMINE ADDUCTS AND CYCLIC DICARBOXYLIC ACID ANHYDRIDES

[75] Inventor: David A. Shimp, Prospect, Ky.

[73] Assignee: Celanese Polymer Specialties Company, Louisville, Ky.

[21] Appl. No.: 924,778

[22] Filed: Jul. 14, 1978

[51] Int. Cl.$^2$ .................. C08G 59/14; C08L 63/00; C08G 59/06

[52] U.S. Cl. ............ 528/103; 260/29.2 EP; 528/87; 528/112; 528/113; 528/148; 528/341; 528/361

[58] Field of Search ............ 528/87, 103, 113, 112, 528/341, 365, 148; 260/29.2 EP

[56] References Cited

U.S. PATENT DOCUMENTS

| | | | |
|---|---|---|---|
| 2,909,448 | 10/1959 | Schroeder | 117/141 |
| 3,230,162 | 1/1966 | Gilchrist | 204/181 |
| 3,308,077 | 3/1967 | Pattison et al. | 260/23 |
| 3,729,435 | 4/1973 | Bachmann et al. | 260/18 EP |
| 3,844,998 | 10/1978 | Jeffrey et al. | 260/29.4 R |
| 3,862,914 | 1/1975 | Anderson et al. | 260/29.2 EP |
| 3,878,145 | 4/1975 | Guldenpfennig | 260/18 EP |
| 3,960,795 | 6/1976 | Dowbenko et al. | 260/29.2 EP |
| 3,985,695 | 10/1976 | Tobias et al. | 260/29.2 EP |
| 4,017,438 | 4/1977 | Jerabek et al. | 260/29.2 EP |
| 4,029,621 | 6/1977 | Hartmann et al. | 260/29.2 EP |
| 4,031,050 | 6/1977 | Jerabek | 260/29.2 TN |
| 4,093,594 | 6/1978 | Anderson | 260/47 EP |
| 4,094,844 | 6/1978 | Allen et al. | 260/29.3 |

Primary Examiner—Earl A. Nielsen
Attorney, Agent, or Firm—Herbert P. Price; K. A. Genoni; T. J. Morgan

[57] ABSTRACT

Polyepoxide resins are adducted with amines and the adducts are then reacted with cyclic dicarboxylic acid anhydrides. The resulting resinous products when salted with an amine are water soluble or water dispersible. The resinous solutions or dispersions can be formulated into coating compositions particularly useful for metal substrates.

14 Claims, No Drawings

SOLUBLE RESINOUS PRODUCTS OF POLYEPOXIDE-AMINE ADDUCTS AND CYCLIC DICARBOXYLIC ACID ANHYDRIDES

BACKGROUND OF THE INVENTION

The field of art to which this invention pertains is synthetic resins containing hydrophilic groups, said resins being soluble or dispersible in water when salted.

Industrial coating processes utilizing aqueous dispersions or solutions of organic resinous film forming compositions continue to grow in importance. The aqueous coating compositions are used in various applications, such as spray coating, flow coating and electrodeposition coating processes.

Resinous compositions which contain carboxylic acid groups capable of being salted with a base have been found to be particularly useful in the manufacture of aqueous coating compositions. Examples of such resinous compositions can be found in U.S. Pat. No. 3,230,162 wherein the reaction of maleinized fatty acids with polyepoxide resins is described. The acid groups react with the epoxide groups and/or the anhydride groups react with the hydroxyl groups of the polyepoxide resins forming ester groups. The unreacted acid or anhydride groups (after hydrolysis) can then be salted with a base and the resinous composition can be dissolved or dispersed in water. Similar compositions are described in U.S. Pat. No. 3,308,077. Related compositions are set forth in U.S. Pat. No. 3,862,914 wherein polycarboxylic acid monoanhydrides, e.g., trimellitic anhydride, are reacted with polyepoxide resins. Although such compositions have found wide utility in the coating industry, they have a disadvantage in that under some conditions the coating compositions made from the polycarboxylic resins are unstable due to the presence of the ester group. The ester groups are subject to hydrolysis and saponification in aqueous systems in the presence of a base.

Another class of resins which have found utility in aqueous compositions are polyamine resins. Such resins when salted with an acid also are soluble or dispersible in water. Examples of polyamine resins are described in U.S. Pat. No. 4,031,050 and 4,017,438, wherein polyepoxide resins are adducted with polyamines. The adducts which contain unreacted primary, secondary, or tertiary amine groups are salted with acids to form water soluble or dispersible systems. The use of epoxy-amine adducts in aqueous paint compositions avoids the problems of ester group instability. However, the use of acids as solubilizing agents presents corrosion problems in storing, handling, applying and baking the coating compositions.

SUMMARY OF THE INVENTION

This invention pertains to resinous compositions. In particular this invention relates to aqueous resinous coating compositions.

By this invention resinous compositions are made by forming an adduct of a polyepoxide resin, an amine, and, alternatively, a monoepoxide and then reacting the adduct with maleic or succinic anhydride under such conditions that the anhydride ring opens forming an amide group and a pendant carboxylic acid group. The polyepoxide resin is derived from a dihydric phenol and an epihalohydrin and has a 1,2-epoxide equivalent weight of about 450 to about 4000. The amine is an alkyl primary monoamine or a polyamine having at least 2 amine nitrogen atoms per molecule and at least 3 amine hydrogen atoms per molecule, said amine having no other groups reactive with epoxide groups. The monoepoxide contains one 1,2-epoxide group per molecule, no other groups reactive with amine groups and contains about 8 to about 24 carbon atoms per molecule. In the composition, about 1 mol of the amine is reacted with each epoxide equivalent of the epoxide resin and about 0.5 to about 1 mol of maleic or succinic anhydride is reacted per each amine nitrogen atom in said adduct. when the adduct is formed from a polyamine and a polyepoxide resin, from 0 up to (x-2) mols of monoepoxide can be reacted per mol of polyamine wherein x represents the number of amine hydrogens originally present.

The resinous compositions of this invention can be salted with amines and can be dissolved or dispersed in water. Such solutions or dispersions can be formulated into coating compositions particularly useful for metallic substrates.

DESCRIPTION OF THE INVENTION

The polyepoxide resins useful in this invention are glycidyl polyethers of polyhydric phenols and contain more than one up to two 1,2-epoxide groups per molecule. Such polyepoxide resins are derived from an epihalohydrin and a dihydric phenol and have an epoxide equivalent weight of about 400 to about 4000. Examples of epihalohydrins are epichlorohydrin, epibromohydrin and epiiodohydrin with epichlorohydrin being preferred. Dihydric phenols are exemplified by resorcinol, hydroquinone, p,p'-hydroxydiphenylpropane (or Bisphenol A as it is commonly called), p,p'-dihydroxybenzophenone, p,p'-dihydroxydiphenyl, p,p'-dihydroxydiphenylethane, bis(2-hydroxynaphthyl)methane, 1,5-dihydroxynaphthalene and the like with Bisphenol A being preferred. These polyepoxide resins are well known in the art and are made in desired molecular weights by reacting the epihalohydrin and the dihydric phenol in various ratios or by reacting a dihydric phenol with a lower molecular weight polyepoxide resin. Particularly preferred polyepoxide resins are glycidyl polyethers of Bisphenol A having epoxide equivalent weights of about 800 to about 2000.

The amines which are reacted with the polyepoxide resins in this invention are primary monoamines and polyamines which contain at least 2 amine nitrogen atoms and at least 3 amine hydrogen atoms per molecule. The primary monoamines are alkyl amines which contain one amine group per molecule, said amine group being a primary amine group, and no other groups which are reactive with epoxide groups. The alkyl group will contain from about 3 to about 18 carbon atoms per molecule. Examples of such amines are n-propylamine, isopropylamine, n-butylamine, sec-butylamine, n-hexylamine, 2-ethylhexylamine, n-octylamine, n-decylamine, dodecylamine, and the like.

The polyamines which are reacted with the polyepoxide resins in this invention contain at least 2 amine nitrogen atoms per molecule, at least 3 amine hydrogen atoms per molecule and no other groups which are reactive with epoxide groups. These polyamines can be aliphatic or cycloaliphatic and contain at least 2 carbon atoms per molecule. Useful polyamines contain 2 to about 6 amine nitrogen atoms per molecule, 3 to about 8 amine hydrogen atoms and 2 to about 20 carbon atoms. Examples of such amines are the alkylene polyamines, ethylene diamine, 1,2-propylene diamine, 1,3-propylene diamine, 1,2-butylene diamine, 1,3-butylene diamine, 1,4-butylene diamine, 1,5-pentalene diamine, 1,6-hexylene diamine, 1,4-diaminocyclohexane, methylamino-propylamine, and the like. Preferred amines for use in this invention are alkylene polyamines of the formula

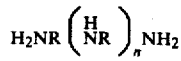

wherein n is an integer of 0 to 4 and R is an alkylene group containing 2 to 4 carbon atoms. Examples of such alkylene polyamines are ethylene diamine, diethylene triamine, triethylene tetramine, tetraethylene pentamine, pantaethylene hexamine, dipropylene triamine, tributylene tetramine and the like. The more preferred amines are the ethylene polyamines with the most preferred being ethylene diamine and diethylene triamine. Mixtures of amines can also be used.

The anhydrides useful in this invention are succinic and maleic anhydride. Such compositions are the cyclic anhydrides of 4 carbon atom dibasic acids.

The monoepoxides which can be used to modify the polyepoxide-amine adducts of this invention are those compounds which contain one 1,2-epoxide group per molecule and no other groups which are reactive with amine groups and which contain about 8 to about 24 carbon atoms per molecule. Examples of monoepoxides are epoxidized hydrocarbons, epoxidized unsaturated fatty esters, monoglycidyl ethers of aliphatic alcohols and monoglycidyl esters of monocarboxylic acids. Examples of such monoepoxides are: epoxidized unsaturated hydrocarbons which contain 8 to 24 carbon atoms, e.g., octylene oxide, decylene oxide, dodecylene oxide and octadecylene oxide: epoxidized monoalcohol esters of unsaturated fatty acids wherein the fatty acids contain about 8 to about 18 carbon atoms and the alcohol contains 1 to 6 carbon atoms, e.g., epoxidized methyl oleate, epoxidized n-butyl oleate, epoxidized methyl palmitoleate, epoxidized ethyl linoleate and the like, monoglycidyl ethers of monohydric alcohols which contain 8 to 20 carbon atoms, e.g., octyl glycidyl ether, decyl glycidyl ether, dodecyl glycidyl ether, tetradecyl glycidyl ether, hexadecyl glycidyl ether and octadecyl glycidyl ether; monoglycidyl esters of monocarboxylic acids which contain 8 to 20 carbon atoms, e.g., the glycidyl ester of caprylic acid, the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,454 which is hereby incorporated by reference. Examples of such glycidyl esters are those derived from about 9 to about 19 carbon atoms, particularly Versatic 911 Acid, a product of Shell Oil Company, which acid contains 9 to 11 carbon atoms. The preferred monoepoxides are the epoxidized hydrocarbons and the monoglycidyl ethers of monohydric alcohols with the most preferred being monoglycidyl ethers of 8 to 18 carbon monohydric alcohols.

In preparing the compositions of this invention, the polyepoxide-amine adduct is first formed by reacting the polyepoxide and the amine under such conditions that the adduct so formed contains about 1 mol of adducted amine for each epoxide equivalent originally present in the polyepoxide resin. This polyepoxide-amine adducting reaction is carried out using about 1 to about 10 mols of amine for each epoxide equivalent of the polyepoxide resin. When the reaction is completed, i.e., when all the epoxide groups have reacted any excess unreacted amine is removed.

When a polyamine is used to form the polyepoxide-amine adduct, the so formed adduct can be modified with a monoepoxide. The monoepoxide reacts with primary and/or secondary amine groups of the adduct forming secondary or tertiary amines. In modifying the polyepoxide-polyamine adducts, from 0 up to (x-2) mols of monoepoxide can be reacted per mol of polyamine in the adduct wherein x is the number of amine hydrogen atoms originally present in the polyamine. For example, if the polyepoxide resin is adducted with 2 mols of diethylene triamine, which amine contains 5 amine hydrogen atoms, up to 3 mols of monoepoxide can be reacted per mol of adducted amine or up to 6 mols of monoepoxide per mol of polyepoxide-amine adduct. When reacting the monoepoxide with the polyepoxide-polyamine adduct, it is important that at least two reactive amine nitrogen atoms be left for subsequent reaction with the anhydride. By reactive amine nitrogen atoms is meant an amine nitrogen atom which retains at least one active amine hydrogen atom, i.e., a primary or secondary amine group. Each mol of adduct must contain at least 2 primary amine groups, 1 primary and 1 secondary amine group, or 2 secondary amine groups.

In preparing the adducts used in this invention, the polyepoxide-amine adduct can be prepared by reacting the polyepoxide resin and the amine. When the reaction is completed, any unreacted amine is removed, preferably by vacuum distillation or by steam distillation. If the adduct is to be modified with a monoepoxide, the monoepoxide can be added after the removal of unreacted amine. As an alternate method, the polyepoxide-polyamine-monoepoxide adduct can be formed by conducting the reaction of the three components concomitantly and not successively. When employing this alternate method, no excess polyamine is used. The polyepoxide resin, one mol of polyamine per epoxide equivalent of the polyepoxide resin and the desired mols of monoepoxide are reacted together. When the reaction is completed, vacuum or steam distillation can be utilized to remove any low boiling nonresinous reaction products.

In preparing the adducts, the epoxide-amine reaction is conducted at a temperature of about 30° C. to about 200° C. for a time sufficient to react all of the epoxide groups, generally about 10 minutes to about 3 hours. When the reaction is completed, unreacted amine and/or low boiling nonresinous products are removed by distillation, preferably under vacuum up to a pot temperature of 250° C., or by steam distillation. If desired, solvents can be used in the adducting reaction, such solvents being unreactive with epoxide groups and amine groups under the reaction conditions.

In preparing the compositions of this invention, the polyepoxide-amine adduct is reacted with succinic or maleic anhydride under such conditions that the anhydride ring opens to react with an amine group to form an amide group and a pendant carboxylic acid group. Sufficient anhydride must be reacted with the adduct so that the resulting product when salted with a base will be water dispersible or water soluble. Generally, sufficient anhydride is reacted to give the resulting product an acid value of at least 25. The minimum amount of anhydride is about 2 mols per mol of adduct. In order to reduce inter and intramolecular salting between primary and secondary amine groups of the adduct and the pendent carboxylic acid group, at least about 0.5 mol of anhydride is reacted per active amine group, i.e., each primary and/or secondary amine group, and, preferably, about 0.7 to about 1 mol per each amine group. This anhydride-amine reaction is conducted under such conditions that the anhydride-amine reaction is promoted and the anhydride-hydroxyl reaction is minimized. In order to do this, the reaction is conducted at a temperature of 20° C. to 100° C. and preferably, about 40° C. to about 70° C. Carrying out the reaction within these temperature ranges also avoids the formation of undesirable imide groups. The time is that sufficient to complete the anhydride-amine reaction, i.e., about 0.2 to 2 hours.

The anhydride-adduct reaction is preferably conducted in solvents in order to lower the viscosity of the reactants and to facilitate mixing and controlling the reaction conditions. Any solvent which is substantially nonreactive with anhydrides and amines under these conditions can be used. Preferably, the solvents contain no primary hydroxyl groups. Since the compositions of this invention are primarily useful in aqueous coating compositions, solvents which have some water solubility are preferred.

In utilizing the compositions of this invention, the pendant carboxylic acid groups are salted with a base and the salted product is dispersed in water. Any base can be used, such as sodium hydroxide, potassium hydroxide, ammonia, and amines such as monoethanolamine, diethanolamine, triethanolamine, N-methyl ethanolamine, N-methyl diethanolamine, triethylamine and dimethylaminoethanol. The preferred bases are the volatile bases.

The compositions of this invention when made into a coating composition will be cured with a crosslinking agent. Such crosslinking agents are aminoplast resins, phenolplast resins and blocked polyisocyanates. Suitable aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Aldehydes useful in this invention are formaldehyde, acetaldehyde and propionaldehyde. The aminoplast resins can be used in the alkylol form but, preferably, are utilized in the ether form wherein the etherifying agent is a monohydric alcohol containing from 1 to about 8 carbon atoms. Examples of suitable aminoplast resins are methylol urea, dimethoxymethylol urea, butylated polymeric urea-formaldehyde resins, hexamethoxymethyl melamine, methylated polymeric melamine-formaldehyde resins and butylated polymeric melamine-formaldehyde resins. Aminoplast resins and their methods of preparation are described in detail in "Encyclopedia of polymer Science and Technology", Volume 2, pages 1-91, Interscience Publishers (1965), which is hereby incorporated by reference.

Phenolplast resins are the reaction products of phenols and aldehydes which contain reactive methylol groups. These compositions can be monomeric or polymeric in nature depending on the molar ratio of phenol to aldehyde used in the initial condensation reaction. Examples of phenols which can be used to make the phenolplast resins are phenol, o, m, or p- cresol, 2,4-xylenol, 3,4-xylenol, 2,5-xylenol, cardanol, p-tert-butylphenol, and the like. Aldehydes useful in this reaction are formaldehyde, acetaldehyde and propionaldehyde. Particularly useful phenolplast resins are polymethylol phenols wherein the phenolic group is etherified with an alkyl, e.g., methyl or ethyl, group. Phenolplast resins and their methods of preparation are described in detail in "Encyclopedia of Polymer Science and Technology", Volume 10, pages 1-68. Interscience Publishers (1969), which is hereby invorporated by reference.

The amount of aminoplast or phenolplast resin used with the resinous compositions of this invention is about 5 to about 35 weight percent of the total vehicle solids weight and, preferably, about 10 to about 20 weight percent.

Useful blocked polyisocyanates are those which are stable in the coating systems at ordinary room temperature and which react with the resinous products of this invention at elevated temperatures.

In the preparation of the blocked organic polyisocyanate, any suitable organic polyisocyanate can be used. Representative examples are the aliphatic compounds such as trimethylene, tetramethylene, pentamethylene, hexamethylene, 1,2-propylene, 1,2-butylene, 2,3-butylene and 1,3-butylene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, and 1,4-naphthalene diisocyanates, the aliphatic-aromatic compounds such as 4,4'-diphenylene methane, 2,4- or 2,6-tolylene, or mixtures thereof, 4,4'-toluidine, and 1,4-xylylene diisocyanates; the triisocyanates such as triphenyl methane-4,4'4''-triisocyanate, 1,3,5-triisocyanate benzene and 2,4,6-triisocyanate toluene; and the tetraisocyanates such as 4,4'-diphenyl-dimethyl methane-2,4'-5,5'-tetraisocyanate; the polymerized polyisocyanates such as tolylene diisocyanate dimers and trimers, polymethylenepolyphenylene polyisocyanates having NCO functionalities of 2 to 3, and the like.

In addition, the organic polyisocyanate can be prepolymer derived from a polyol such as glycols, e.g., ethylene glycol and propylene glycol, as well as other polyols such as gylcerol, trimethylolpropane, hexanetriol, pentaerythritol and the like, as well as monoethers, such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxyl-terminated polyethers and can be linear or branched. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

Any suitable aliphatic, cycloaliphatic, aromatic-alkyl monoalcohol and phenolic compound can be used as a blocking agent in the practice of the present invention, such as lower aliphatic alcohols, such as methyl ethyl, chloroethyl, propyl, butyl, amyl, hexyl, heptyl, octyl, nonyl, 3,3,5-trimethylhexanol, decyl and lauryl alcohols, and the like; the aromatic-alkyl alcohols, such as, phenylcarbinol, methylphenylcarbinol, ethylene glycol monoethyl ether, ethylene glycol monobutyl ether and the like; the phenolic compounds such as phenol itself, substituted phenols in which the substituents do not adversely affect the coating operations. Examples include cresol, nitrophenol, chlorophenol and t-butyl phenol. Additional blocking agents include tertiary hydroxyl amines, such as diethylethanolamine and oximes, such as methylethyl ketoxmine, acetone oxime and cyclohexanone oxime and caprolactam.

The blocked polyisocyanate is formed by reacting a sufficient quantity of blocking agent with the organic polyisocyanate to insure that no free isocyanate groups are present.

The amount of blocked polyisocyanate used will vary from about 15 weight percent to about 40 weight percent based on the total solids weight and, preferably, about 20 weight percent to about 25 weight percent.

The resinous compositions of this invention can be formulated into can coating compositions and can be applied to the interior of aluminum and steel cans by airless spray application. The closures for such cans can also be coated with the compositions of this invention, such coatings being applied by roller coating processes. The resinous compositions can also be formulated into pigmented coatings particularly useful as primer coatings for metal substrates. Such coatings can be applied by electrodeposition, dipping, spraying or brushing.

The following examples will describe the invention in more detail. Parts and percentages where used unless otherwise designated are parts and percentages by weight.

EXAMPLE 1

Part A

To a suitable reactor were added 1600 parts of the diglycidyl ether of Bisphenol A having an epoxide equivalent weight of 190. Heat was applied and at a temperature of 85° C., 800 parts of Bisphenol A and 3.28 parts of triphenyl phosphine were added. Heating was continued to raise the temperature to 130° C., at which point the heat source was removed and the exothermic reaction carried the temperature at 160° C. The temperature was gradually raised to 180° C. and after 2 hours heating (measured from the time 160° C. was reached), the resinous product was poured into a container and cooled. The product had an epoxide equivalent weight of 1560 and a viscosity when dissolved in diethylene glycol monobutyl ether at 40% solids of Z (Gardner-Holdt at 25° C.).

Part B

To a suitable reactor were added 900 parts of the resinous product of Part A and 750 parts of toluene. Heat and agitation were applied to dissolve the resin. When solution was attained the temperature was adjusted to 70° C. and 192 parts of ethylene diamine were added. The temperature was held at 65°-70° C. for one hour. The temperature was then raised to 100° C. and was held at 100° C. for one hour. The reactor was fitted for distillation and heat was applied to distill the toluene and excess ethylene diamine. When the temperature reached 180° C., vacuum (28.5 inches of mercury) was applied and the 180° F. temperature was held 15 minutes. The vacuum was then released and the product was dissolved to 60% solids with 621.1 parts of the monopropyl ether of propylene glycol.

Part C

To a suitable reactor were added 216.67 parts of the amine adduct solution product of Part B. The reactor contents were heated to 40° C. and 13.25 parts of succinic anhydride were added. After 30 minutes at 40° C., 8.25 parts of dimethyl amino ethanol were added and heating at 40° C. was continued for 30 minutes. Deionized water, 280 parts, was then slowly added over a 30 minute period with the temperature at 40°-50° C. The resulting clear yellow solution had a solids content of 27.65%, a Gardner-Holdt viscosity at 25° C. of B and a pH of 6.9.

Part D

To a suitable container were added 50 parts of the solution described in Part C, 2.12 parts of hexamethoxymethyl melamine and 1.5 parts of deionized water. After thorough mixing, the solution had a solids content of 29.74%, a Gardner-Holdt viscosity at 25° C. of C and a pH of 7.1. Films were drawn down on treated aluminum panels with a No. 10 Meyer rod and were baked for 2 minutes at 213° C. The cured films had excellent appearance and high gloss. They passed 16 methylethyl ketone rubs and passed a wet adhesion test 100%. No effect to the films was noted after heating the coated panels in water for 10 minutes at 82° C. Additional films were prepared in the same manner but were baked 2.5 minutes at 177° C. These films had excellent appearance and high gloss. They passed 9 methylethyl ketone rubs and passed the wet adhesion test 100%. After ten minutes in water heated at 82° C., the films showed no blushing and no effect.

After 1 week at 49° C., the solution showed no change. After 3 weeks at 49° C., a colloidal dispersion had formed with no settling. Films prepared from the aged solution, using a No. 10 Meyer rod on treated aluminum with a 2 minute 213° C. bake, had excellent film properties. They passed 25 methylethyl ketone rubs, 100% wet adhesion and no blushing or effect after 10 minutes in water heated at 82° C.

Another 50 parts of the solution described in Part C were blended with 2.4 parts of a methylated methylol melamine resin at 80% solids in water. After thorough mixing, the solution had a solids content of 30.05%, a Gardner-Holdt viscosity at 25° C. of $A_1$ and a pH of 6.3. Films drawn down on treated aluminum with a No. 10 Meyer rod and baked for 2 minutes at 213° C. had excellent appearance and high gloss. They passed 18 methylethyl ketone rubs and passed the wet adhesion test 100%. No effect on the films was noted by 10 inutes contact with water heated at 82° C. Additional films were prepared in the same manner but were baked 2.5 minutes at 177° C. These films had excellent appearance and high gloss, they passed the wet adhesion test 100% and passed 48 methylethyl ketone rubs. They exhibited no blushing after 10 minutes in water heated to 82° C.

After 3 weeks at 49° C., the blend described above had gelled.

EXAMPLE 2

To a suitable reactor were added 216.67 parts of the amine adduct solution product of Example 1, Part B. The reactor contents were heated to 40° C. and 13.25 parts of succinic anhydride dissolved in 9 parts of hot dimethylformamide were added. After 30 minutes at 40° C., 8.25 parts of dimethylaminoethanol were added and heating at 40° C. was continued for 30 minutes. Deionized water, 280 parts, was then added slowly over a 30 minute period with the temperature at 40°-50° C. The resulting clear yellow solution had a solids content of 27.17%, a Gardner-Holdt viscosity at 25° C. of B and a pH of 6.9.

To a suitable container were added 50 parts of the above solution, 2.12 parts of hexamethoxymethyl melamine and 2 parts of deionized water. After thorough mixing, the solution had a solids content of 29.32%, a Gardner-Holdt viscosity at 25° C. of C and a pH of 6.8. Films drawn down on treated aluminum panels with a No. 10 Meyer rod and baked at 213° C. for 2 minutes had excellent appearance and high gloss. They passed 15 methylethyl ketone rubs and passed the wet adhesion test 100%. After 10 minutes in water heated at 82° C., the films were unaffected. Additional films were prepared in the same manner but were baked 2.5 minutes at 177° C. The film properties were the same as those obtained after the 213° C. bake except the methylethyl ketone rubs were 10.

After 3 weeks at 49° C., the solution had formed a colloidal dispersion with a Gardner-Holdt viscosity at 25° C. of greater than Z.

Another 50 parts of the solution described in the first paragraph of this example were blended with 2.4 parts of a solution of methylated methylol melamine at 80% solids in water. The resulting solution had a solids content of 29.9%, a Gardner-Holdt viscosity at 25° C. of $A_1$ and a pH of 6.2. Films drawn down on treated aluminum panels with a No. 10 Meyer rod and baked at 213° C. for 2 minutes had excellent appearance and high gloss. They passed 13 methylethyl ketone rubs and passed the wet adhesion test 100%. After 10 minutes in water heated at 82° C., the films were unaffected. Additional films were prepared in the same manner but were baked 2.5 minutes at 177° C. The film properties were the same as those obtained after the 213° C. bake except the methylethyl ketone rubs were greater than 50.

After 3 weeks at 49° C., the solution gelled.

EXAMPLE 3

To 100 parts of the resin solution described in the first paragraph of Example 2 was added 0.67 part of dimethylamino ethanol. The pH of the resulting solution was 8.5. To 50 parts of this solution were blended 2.12 parts of hexamethoxymethyl melamine and 2 parts of deionized water. Films were drawn down on treated aluminum panels with a No. 10 Meyer rod and were baked 2.5 minutes at 177° C. The films had excellent appearance and high gloss. They passed 8 methylethyl ketone rubs and passed the wet adhesion text 100%. After 10 minutes in water heated at 82° C., the films were unaffected. After 3 weeks at 49° C., the solution exhibited no change.

To another 50 parts of the solution referred to above which contained additional tertiary amine were added 2.40 parts of a solution methylated melamine formaldehyde resin at 80% solids in water. Films were drawn down from the blend on treated aluminum panels with a No. 10 Meyer rod and were baked for 2.5 minutes at 177° C. The films had excellent appearance and high gloss. They passed more than 50 methylethyl ketone rubs and passed the wet adhesion test 100%. After 10 minutes in water heated at 82° C., the films were unaffected. After 3 weeks at 49° C., the coating solution had become translucent with some settling of solid materials.

EXAMPLE 4

To a suitable reactor were added 1621.6 parts of the diglycidyl ether of Bisphenol A having an epoxide equivalent weight of 190. Heat was applied and at a temperature of 70° C., 778.4 parts of Bisphenol A and 3.28 parts of tripheynyl phosphine were added. Heating was continued to raise the temperature to 130° C., at which point the heating source was removed and the exothermic reaction carried the temperature to about 160° C. When the exothermic reaction was over, the temperature was slowly raised to 180° C., and was held at 180° C. for 2 hours. The resinous product was then poured into a container and cooled. The epoxide resin product had an epoxide equivalent weight of 1414 and a Gardner-Holdt viscosity at 25° C. of X at 40% solids in diethylene glycol monobutyl ether.

Part B

To a suitable reactor were added 600 parts of the epoxide resin product of Part A and 500 parts of toluene. Heat and agitation were applied to dissolve the resin. When solution was obtained, the temperature was adjusted to 70° C. and 128 parts of ethylene diamine were added. The temperature was held at 70° C. for one hour and at 100° C. for one hour. The reactor was then fitted for distillation and heat was applied to distill the toluene and excess ethylene diamine. When the temperature reached 170° C., vacuum (28.5 inches of mercury) was applied and the temperature was held at 170°–180° C. for 15 minutes. The vacuum was then released and the adduct product was poured into a container and cooled.

Part C

To a suitable reactor were added 100 parts of the adduct product of Part B and 66.67 parts of monopropyl ether of propylene glycol. Heat and agitation were applied to dissolve the adduct. The temperature was adjusted to 40° C. and 13.57 parts of succinic anhydride dissolved in hot dimethyl formamide were added. The temperature was held at 40° C. for one hour and at 60° C. for 30 minutes. At the end of this heating period, 12 parts of dimethylaminoethanol were added. When dissolved, the reaction product was thinned with 240 parts of deionized water. The resulting clear solution had a solids content of 25.73% and a pH of 8.3.

Part D

Fifty parts of the solution of Part C of this example were blended with 2 parts of hexamethoxymethyl melamine and 2 parts of deionized water. The resulting blend had a solids content of 27.53%, a viscosity, Gardner-Holdt at 25° C., of B and a pH of 8.1. Films were drawn down on treated aluminum panels with a No. 10 Meyer rod and were baked 2 minutes at 213° C. The cured films had excellent appearance and high gloss. They passed 47 methylethyl ketone rubs and passed the wet adhesion test 100%. No effect to the films was noted after 10 minutes in water heated at 82° C. Additional films were prepared in the same manner but were baked for 2.5 minutes at 177° C. the film properties were the same as those obtained from the films baked at 213° C. except the methylethyl ketone rubs were 21.

After 3 weeks at 49° C., the blend was clear with no change in viscosity. Properties of the films prepared as described above and baked at 177° C. for 2.5 minutes were excellent as evidenced by excellent appearance, high gloss, 100% wet adhesion, 50 methyl ethyl ketone rubs and no effect after 10 minutes immersion in water heated to 82° C.

To another 50 parts of the solution of Part C of this example were blended 2.2 parts of a solution methylated methylol melamine resin at 80% solids in water. The resulting blend had a solids content of 28.01%, a Gardner-Holdt viscosity at 25° C. of A and a pH of 7.4. Films drawn down on treated aluminum panels were baked for 2 minutes at 213° C. The films had excellent appearance, high gloss and 100% wet adhesion, passed 15 methylethyl ketone rubs and exhibited no effect after 10 minutes immersion in water heated to 82° C. Additional films were prepared in the same manner but were baked at 177° C. for 2.5 minutes. The properties of these films were the same as those which were cured at 213° C. except they passed 48 methylethyl ketone rubs.

After 3 weeks at 49° C., the blends were translucent with some white resinous settlement.

EXAMPLE 5

Using the same procedure as described in Example 1, Part B, 900 parts of the epoxy resin described in Example 1, Part A were reacted with 192 parts of ethylene diamine while dissolved in 750 parts of toluene. After the adducting reaction was completed, the toluene and excess ethylene diamine were removed. The resinous epoxy-amine adduct was dissolved in 501.66 parts of the monopropyl ether of propylene glycol. The resulting solution had a non-volatile content of 65%.

To a suitable reactor were added 300 parts of the epoxy-amine adduct solution. Heat was applied raising the temperature to 50° C. Succinic anhydride, 19.88 parts, dissolved in hot dimethyl formamide, 13.5 parts, was added to the reactor with vigorous stirring. The temperature was held for one hour at 50°-60° C. Dimethylamino ethanol, 12.37 parts, was then added and the temperature was held at 60° C. for 15 minutes. The salted resin was then thinned with 425 parts of deionized water. The resulting solution had a non-volatile content of 27.88%, a Gardner-Holdt viscosity at 25° C. of $A_1$ and a pH of 7.5.

To 100 parts of the aqueous solution were blended 0.69 part of dimethylaminoethanol and 4.24 parts of hexamethoxymelamine. Films were prepared from the blend on treated aluminum panels and electrolytic tin plate panels with a No. 10 Meyer rod and were baked 2.5 minutes at 177° C. The films had excellent appearance, high gloss, 100% wet adhesion, and exhibited no effect after 10 minutes immersion in water heated at 82° C. The film on the aluminum panel passed 10 methylethyl ketone rubs, the one on the tin plate 9 rubs.

To another 100 parts of the aqueous solution were added 1.83 parts of a 25% solution of trimethylamine in water and 4.24 parts of hexamethoxymethyl melamine. Films prepared and cured as described above had excellent appearance, high gloss, 100% wet adhesion and no effect from immersion in 82° C. water 10 minutes. The films on the aluminum panels passed 19 methylethyl ketone rubs, the ones on the tin plate 14 rubs.

EXAMPLE 6

Using the same procedure as described in Example 1, Part B, an epoxy-amine adduct was prepared by reacting 900 parts of the epoxy resin of Example 1, part A with 192 parts of ethylene diamine while dissolved in 750 parts of toluene. At the completion of the adducting reaction, and after removal of the toluene and excess ethylene diamine, the adduct was dissolved in 350 parts of monopropyl ether of propylene glycol and 152 parts of secondary butanol. The resulting adduct solution had a nonvolatiles content of 65.6%.

To a suitable reactor were added 600 parts of the adduct solution. Heat was applied raising the temperature to 50° C. Succinic anhydride, 44 parts, was dissolved in 29.8 parts of hot dimethyl formamide. Half of the anhydride solution was added to the reactor with vigorous stirring. After 15 minutes at 50°-60° C., the remainder of the anhydride solution was added. Heating at 50°-60° C. was continued for 30 minutes. Dimethylaminoethanol, 19.58 parts, was added and heating at 50°-60° C. was continued for 15 minutes. The salted solution was then thinned with 753.3 parts of deionized water. After the addition of 1.96 parts of dimethylaminoethanol and 100 parts of deionized water, the solution had a nonvolatile content of 28.26%, a Gardner-Holdt viscosity at 25° C. of $Z_6$ and a pH of 6.1. The percent salting of the acid groups with the amine was 55% and the mol ratio of anhydride groups to amine groups reacted was 1:1.

A portion of the solution was salted with additional dimethylaminoethanol to 60% salting and the pH was adjusted to 8.5 with aqueous ammonia. Coating compositions were prepared by the addition of hexamethoxymelamine in the amount of 13% based on total solids and thinning with water to 25.6% nonvolatiles. Treated aluminum, electrolytic tin plate and tin free steel panels were coated with the compositions and were baked at 177° C. for 2.5 minutes. Good film properties were obtained.

EXAMPLE 7

To a suitable reactor equipped with a stirrer, addition funnel, thermometer and reflux condenser were added 22.2 parts of ethylene diamine and 88.8 parts of secondary butanol. To the addition funnel were added a solution of 345.2 parts of the glycidyl polyether of Bisphenol A having an epoxide equivalent weight of 933, 88.1 parts of the glycidyl ethers of mixed fatty alcohols containing predominantly n-octyl and n-decyl groups, said glycidyl ethers having an epoxide equivalent weight of 238. The solution of diamine in butanol was heated to 50° C. and slow addition of the epoxy solution was begun over a period of 2 hours while maintaining the temperature between 50° and 60° C. After the addition was completed, the temperature was held for one hour at 60° C. and then one hour at 70° C.

Maleic anhydride, 72 parts, was dissolved in 49.3 parts of methylethyl ketone and one third of this solution was added to the reactor with the reactor contents at 60° C. The temperature was held at 60° C. and after about 10 minutes, the second one third portion was added. After about 10 minutes at 60° C., the remaining portion was added. The temperature was then held at 60°-65° C. for 1.5 hours. At the end of this heating period, the reaction product was poured into a container and cooled. The solution at 64.75% nonvolatiles had a Gardner-Holdt viscosity at 25° C. of greater than $Z_7$.

Three hundred parts of the above solution and 24.2 parts of dimethylaminoethanol were heated to 50°-60° C. and were thinned with 282.8 parts of deionized water followed by 75 parts. The resulting clear yellow solution had a non-volatiles content of 28.48% and a Gardner-Holdt viscosity at 25° C. of Y-Z.

To 60 parts of the solution were added 2.5 parts of trimethoxymethyl melamine at 80% solids in isobutanol and 7 parts of deionized water. Coatings were drawn down on tin-free steel panels with a No. 30 Meyer rod and were baked 25 minutes at 149° C. The films were well cured and tough with a pencil hardness of 3H. They passed more than 50 methylethyl ketone rubs, exhibited very slight blushing after 10 minutes in water heated at 82° C., but failed the wet adhesion test completely.

EXAMPLE 8

To a suitable reactor equipped with an addition funnel, stirrer, thermometer and reflux condenser were added 65 parts of n-octylamine. To the addition funnel was added a solution of 466.5 parts of the glycidyl polyether of Bisphenol A having an epoxide equivalent weight of 933, 90 parts of secondary butanol and 187.6 parts of monopropyl ether of propylene glycol. The n-octylamine was heated to 50° C., and slow addition to the reactor of the solution in the dropping funnel was begun and completed in one hour with the temperature being held at 50°-55° C. The temperature was then held at 55° C. for one hour and 2 hours at 70° C.

Maleic anhydride, 49 parts, was dissolved in 35 parts of methyl-n-butylketone. Approximately one third of the solution was added to the reactor with vigorous agitation while controlling the temperature at about 60° C. When the exothermic reaction was completed, the second one third portion was added again with vigorous agitation and while controlling the temperature at about 60° C. When the exothermic reaction was completed, the final one third portion was added again with vigorous agitating and temperature control at about 60° C. The temperature was then held at 60°-65° C. for 1.5 hours. The resulting product had an acid value of 56, a solids content of 65% and a Gardner-Holdt viscosity at 25° C. of greater than $Z_7$.

Three hundred parts of the above solution was weighed into a suitable reactor along with 14.94 parts of dimethylaminoethanol. The temperature was raised to 50° C. Deionized water, 294.4 parts, was added over a 30 minute period while letting the temperature fall to room temperature. An additional 50 parts of deionized water were then added. The resulting translucent microemulsion had a solids content of 29.6%, a Gardner-Holdt viscosity at 25° C. of Y-Z and a pH of 8.1.

In a suitable container, 60 parts of the translucent microemulsion were blended with 2.47 parts of trimethoxymethyl melamine at 80% solids in isobutanol and 6 parts of deionized water. The resulting translucent, nearly clear solution had a solids content of 28.83%, a pH of 7.9 and a Gardner-Holdt viscosity at 25° C. of C-D. Films were drawn down on tin free steel panels with a No. 30 Meyer rod and were baked 25 minutes at 149° C. The resulting cured films had good smoothness and continuity and a pencil hardness of 2H. They passed 17 methylethyl ketone rubs and showed no effect after 10 minutes in water at 82° C. However, they completely failed the wet adhesion test. When baked at 135° C. for 25 minutes, similar films had the same properties. After a 121° C. bake, the MEK rubs were lower, 14, and the films exhibited some blushing after 10 minutes in 82° C. water.

The translucent microemulsion, 60.00 parts, was blended with 4.48 parts of butylated melamine formaldehyde resin at 70% solids in a n-butanol and 10 parts of water. The resulting opaque dispersion had a pH of 7.7, a Gardner-Holdt viscosity of C-D and a solids content of 28.06%. Films were drawn down on tin free steel panels with a No. 30 Meyer rod and were baked 25 minutes at 149° C. The resulting cured films had good smoothness and continuity and a pencil hardness of 2H. They passed 14 methyl ethyl ketone rubs and showed no effect at 10 minutes in water at 82° C. They completely failed the wet adhesion test. When baked at 135° C. for 25 minutes, similar films had the same properties. After a 121° C. bake for 25 minutes, the pencil hardness was H, the methyl ethyl ketone rubs 14, the films exhibited slight blushing after 10 minutes in 82° C. water, and the wet adhesion was 0%.

It is to be understood that the foregoing detailed description is given merely by way of illustration and that many variations may be made therein without departing from the spirit of the invention.

What is claimed is:

1. A resinous composition comprising the acid-amide reaction product of
  (A) an adduct of
    (1) a polyepoxide resin derived from a dihydric phenol and an epihalohydrin, said polyepoxide resin having a 1,2-epoxide equivalent weight of about 450 to about 4000; and
    (2) an alkyl primary monoamine or a polyamine having at least 2 amine nitrogen atoms per molecule and at least 3 amine hydrogen atoms per molecule, said amines having no other groups reactive with epoxide groups; and
  (B) maleic or succinic anhydride wherein about one mol of (2) is reacted with each epoxide equivalent of (1) and wherein about 0.5 to 1 mol of (B) is reacted per each amine nitrogen atom in said adduct.

2. The composition of claim 1 wherein the polyepoxide resin is derived from p,p'-dihydroxydiphenyl propane and epichlorohydrin and has a 1,2-epoxide equivalent weight of about 800 to about 2000.

3. The composition of claim 1 wherein the alkyl group of the primary monoamine contains 3 to 18 carbon atoms.

4. The composition of claim 1 wherein the polyamine is an alkylene polyamine having the formula

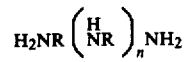

wherein n is an integer of 0 to 4 and R is an alkylene group containing 2 to 4 carbon atoms.

5. The composition of claim 4 wherein the alkylene polyamine is an ethylene polyamine.

6. The composition of claim 5 wherein the ethylene polyamine is ethylene diamine.

7. The composition of claim 1 wherein about 0.7 to about 1 mol of anhydride is reacted per each amine nitrogen atom.

8. A resinous composition comprising the acid-amide reaction product of
  (A) an adduct of
    (1) a polyepoxide resin derived from a dihydric phenol and an epihalohydrin, said polyepoxide resin having a 1,2-epoxide equivalent weight of about 450 to about 4000;
    (2) a polyamine having at least 2 amine nitrogen atoms per molecule and at least 3 amine hydrogen atoms per molecule, said amine having no other groups reactive with epoxide groups; and
    (3) a monoepoxide which contains one 1,2-epoxide group and no other groups reactive with amine groups, said monoepoxide having about 8 to 24 carbon atoms per molecule; and
  (B) maleic or succinic anhydride, wherein about one mol of (2) is reacted with each epoxide equivalent of (1), wherein 0 to about (x-2) mols of (3) are reacted per mol of polyamine wherein x represents the number of amine hydrogens originally present, and wherein about 0.5 to about 1 mol of B is reacted per each primary and secondary amine group in said adduct.

9. The composition of claim 8 wherein the polyepoxide resin is derived from p,p'-dihydroxydiphenyl propane and epichlorohydrin and has a 1,2-epoxide equivalent weight of about 800 to about 2000.

10. The composition of claim 8 wherein the polyamine is an alkylene polyamine having the formula

wherein n is an integer of 0 to 4 and R is an alkylene group containing 2 to 4 carbon atoms.

11. The composition of claim 10 wherein the alkylene polyamine is an ethylene polyamine.

12. The composition of claim 11 wherein the ethylene polyamine is ethylene diamine.

13. The composition of claim 8 wherein the monoepoxide is a glycidyl ether of a fatty alcohol wherein the fatty alcohol contains 8 to 18 carbon atoms.

14. The composition of claim 8 wherein two to three mols of monoepoxide are reacted per mol of adduct and wherein 2.8 to 4 mols of anhydride are reacted per mol of adduct.

* * * * *